(12) United States Patent
Lybeck et al.

(10) Patent No.: US 8,001,233 B2
(45) Date of Patent: Aug. 16, 2011

(54) COMMUNICATION SYSTEM, NETWORK ELEMENT, AND METHOD FOR CONFIGURING A NETWORK ELEMENT USING ROUTING SUBSCRIPTION INFORMATION

(75) Inventors: Mark Lybeck, Vanda (FI); Krisztian Kiss, San Diego, CA (US); Ilkka Westman, Helsinki (FI); Miikka Poikselka, Espoo (FI)

(73) Assignee: Nokia Corporation, Espoo (FI)

( * ) Notice: Subject to any disclaimer, the term of this patent is extended or adjusted under 35 U.S.C. 154(b) by 860 days.

(21) Appl. No.: 10/506,185

(22) PCT Filed: Mar. 25, 2004

(86) PCT No.: PCT/IB2004/001299
§ 371 (c)(1),
(2), (4) Date: Aug. 31, 2004

(87) PCT Pub. No.: WO2004/086800
PCT Pub. Date: Oct. 7, 2004

(65) Prior Publication Data
US 2005/0108347 A1    May 19, 2005

(30) Foreign Application Priority Data

Mar. 25, 2003 (GB) .................................. 0306827.7
Aug. 19, 2003 (GB) .................................. 0319459.4

(51) Int. Cl.
*G06F 15/173* (2006.01)
(52) U.S. Cl. ......... 709/224; 709/225; 709/227; 709/228
(58) Field of Classification Search .................. 709/224, 709/225, 227, 228
See application file for complete search history.

(56) References Cited

U.S. PATENT DOCUMENTS

| | | | |
|---|---|---|---|
| 6,366,926 B1 * | 4/2002 | Pohlmann et al. | 707/104.1 |
| 6,621,793 B2 * | 9/2003 | Widegren et al. | 370/230.1 |
| 6,882,850 B2 | 4/2005 | McConnell et al. | 455/453 |
| 6,954,798 B2 * | 10/2005 | Eastham | 709/238 |
| 2002/0015485 A1 * | 2/2002 | Bhusri | 379/220.01 |
| 2002/0036983 A1 | 3/2002 | Widegren et al. | 370/230.1 |
| 2002/0120711 A1 * | 8/2002 | Bantz et al. | 709/217 |

(Continued)

FOREIGN PATENT DOCUMENTS

EP    1 250 023 A    10/2002

(Continued)

OTHER PUBLICATIONS

3GPP TR24.841 V0.5.0, "*3rd Generation Partnership Project; Technical Specification Group Core Network; Presence Service based on Session Initiation Protocol (SIP); Functional Models, Information Flows and Protocol Details (Release 6)*" Feb. 2003, pp. 1-98.

(Continued)

*Primary Examiner* — Jeffrey Pwu
*Assistant Examiner* — Abdelnabi O Musa
(74) *Attorney, Agent, or Firm* — Harrington & Smith

(57) ABSTRACT

There is disclosed a method of providing subscription services, the method comprising: establishing a subscription dialog to activate a subscription; terminating said subscription dialog upon establishment of said subscription; and establishing a notification to a subscriber by the steps of: determining the location of the subscriber; establishing a notification dialog to notify the located subscriber; and terminating said notification dialog upon completion of the notification.

28 Claims, 8 Drawing Sheets

U.S. PATENT DOCUMENTS

2003/0040280 A1 2/2003 Koskelainen
2005/0021622 A1* 1/2005 Cullen .................. 709/204

FOREIGN PATENT DOCUMENTS

WO    WO-02/096128 A2    11/2002

OTHER PUBLICATIONS

ETSI TS 123 218 V5.3.0, "*Digital Cellular Telecommunications System (Phase 2+); Universal Mobil Telecommunications System (UMTS); IP Multimedia (IM) Session Handling; IM Call Model; Stage 2 (3GPP TS 23.218 version 5.3.0 Release 5)*", Dec. 2002, pp. 1-56.

Rosenberg, J., et al., XP-002323877, "*SIP: Session Initiation Protocol*", Jun. 2002, pp. 1-269.

European Office Action Examination Report application No. 04 723 284.8-2412 dated Apr. 5, 2007.

Roach A, et al.; "SIP-Specific Event Notification", XP002189884, Jul. 2001, pp. 1-32.

3GPP TS 23.241 V0.3.0 (Feb. 2002), $3^{rd}$ Generation Partnership Project: Technical Specification Group Terminals; 3GPP Generic User Profile—Data Description Framework; State 2 (Release 6), Joint Ad-Hoc on Generic User Profile, Cork, Ireland, Apr. 2-5, 2002.

3GPP TS 29.228 V5.2.0 (Dec. 2002), $3^{rd}$ Generation Partnership Project: Technical Specification Group Core Network; IP Multimedia (IM) Subsystem Cx and Dx Interfaces; Signalling Flows and Message Contents; (Release 5).

3GPP TS 24.229 V5.4.0 (Mar. 2003), $3^{rd}$ Generation Partnership Project; Technical Specification Group Core Network; IP Multimedia Call Control Protocol Based on SIP and SDP; Stage 3 (Release 5).

Rosenberg, et al., "SIP Extensions for Presence", IETF, draft, pp. 1-40, Jul. 20, 2001.

\* cited by examiner

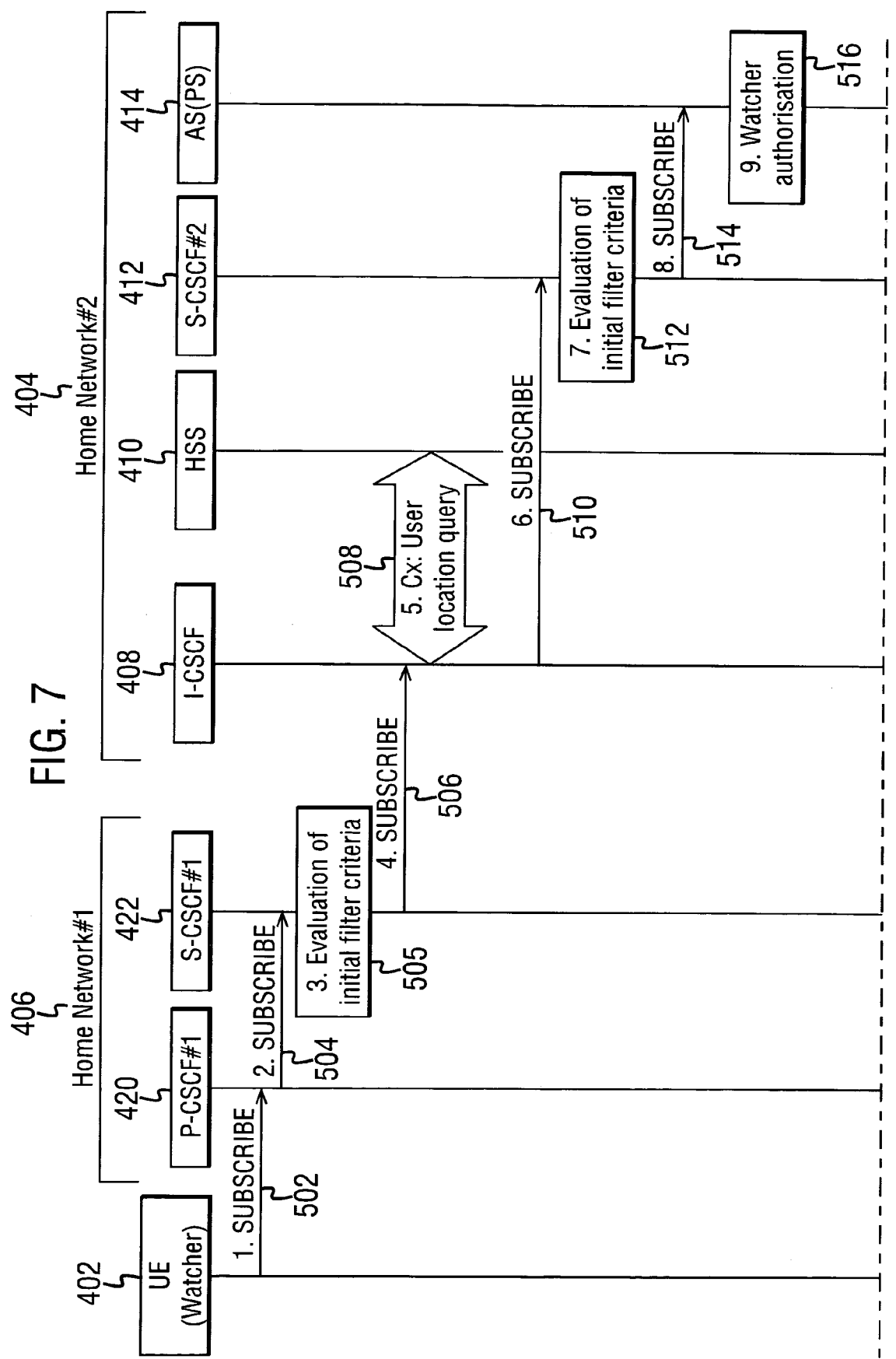

COMMUNICATION SYSTEM, NETWORK ELEMENT, AND METHOD FOR CONFIGURING A NETWORK ELEMENT USING ROUTING SUBSCRIPTION INFORMATION

BACKGROUND OF THE INVENTION

1. Field of the Invention

The described invention relates generally to the field of subscription services such as, for example, presence services, and particularly, but not exclusively, to the support of subscription services using session initiation protocol dialogs.

2. Description of the Related Art

Typically, in 3GPP all-IP architectures, users may subscribe to subscription services. The subscription service is usually initiated using subscription messages. The preferred subscription messages often utilise SIP (Session Initiation Protocol) messages. On detection of a subscribed event, a subscription server normally notifies the subscriber of the event, commonly using notification messages. In known systems, the subscription and/or the notification messages are generally facilitated by a proxy server configured as a connection processing server (CPS). The subscription typically establishes an SIP dialog through the CPS, and the CPS usually maintains that dialog and it is normally used for all notifications. In this way the CPS normally effectively records the route of the subscription.

In many practical implementations, a CPS may support a large amount of subscriptions, and the common necessity to record a large number of routes associated with a large number of subscriptions in order to facilitate notifications may significantly impinge upon the resources of the CPS. In addition, for a large amount of time the dialogs associated with the recorded routes and stored in the CPS are generally unused. Therefore the capacity of the CPS is typically used by inactive dialogs.

3GPP IMS Release 6 introduces the presence service. 3GPP TS 23.241 6.1.0 defines that a presentity's serving call state or session control function (S-CSCF) is at least usually not required to record-route the dialog of the subscription for the presence service. 'Record-routing' of the subscription normally effectively involves the S-CSCF, acting as a proxy server for the dialog, recording the route of the subscription messages. More particularly, it commonly involves the proxy server storing the dialog details, in other words, maintaining the dialog once the subscription is set up. The usual disadvantage with the proxy server maintaining the 'record-route' is that it typically utilises the limited resources of the proxy server.

A problem generally exists in providing a proxy server with the ability to know when it is appropriate not to record the route and when recording of the route would be advantageous, depending on the type of services being accessed.

It is therefore an aim of certain embodiments of the present invention to address one or more of the above-stated problems.

SUMMARY OF THE INVENTION

According to one aspect the present invention provides a method of providing subscription services comprising: establishing a subscription dialog to activate a subscription; terminating said subscription dialog on establishment of said subscription; and establishing a notification to a subscriber, comprising: determining the location of the subscriber; establishing a notification dialog to notify the located subscriber; and terminating said notification dialog on completion of the notification.

The subscription dialog and the notification dialog may comprise SIP sessions.

The method may further comprise the step of storing a subscription identifier on establishment of said subscription.

The step of establishing a notification to a subscriber may be responsive to occurrence of a subscribed event.

The step of determining the location of a subscriber may comprise sending the subscription identifier to a location services function.

In a further aspect the invention provides a network element adapted for the provision of subscription services comprising: receiving means for receiving a subscription request for a subscription service from a subscriber; means for supporting a dialog session between the subscriber and the subscription service; transmitting means for transmitting the subscription request to a subscription service; wherein the receiving means is adapted to further receive a subscription acknowledgement from the subscription service and the transmitting means is further adapted to forward the subscription acknowledgement to the subscriber, and further wherein responsive to the acknowledgement the network element releases the dialog session.

The receiving means may be further adapted to receive a notification from the subscription service for a subscriber, wherein responsive thereto a notification dialog session is established the transmitting means being adapted to transmit a location request to determine the location of the subscriber, wherein responsive to location information for the subscriber the transmitting means is further adapted to transmit the notification to the subscriber.

The receiving means may be adapted to receive an acknowledgement of said notification from the subscriber, wherein responsive to said acknowledgement the transmitting means transmits an acknowledgement to the subscription service and releases the dialog session.

The dialog may comprise an SIP session.

The network element may be further adapted to store a subscription identifier on establishment of said subscription.

The step of establishing a notification to a subscriber may be responsive to occurrence of a subscribed event.

The step of determining the location of a subscriber may comprise sending the subscriber identifier to a location services function.

According to a further aspect the invention provides a communication system for providing a communication system comprising: a subscriber for initiating a subscription dialog, including sending a subscription request; a network element for receiving the subscription request and for forwarding the subscription request to a subscription service; and a subscription service element for receiving the subscription request from the network element, and having means for storing a subscriber identifier, wherein responsive to an acknowledgement from the subscription service element the network element releases the subscription dialog, and wherein responsive to a notification message of a notification dialog from the subscription element, the network element determines a location for the subscriber and forwards the notification message to the subscriber.

According to another aspect the invention may provide a method of configuring a server comprising: receiving a record-route instruction and a subscription request; and recording the route of the subscription request in dependence on the record-route instruction.

In one embodiment the record-route instruction is received prior to the subscription request. In another embodiment the subscription request is received prior to the record-route instruction.

The record-route instruction may be fetched. The record route instruction may be received as part of a filter criterion. The filter criteria may be service specific. The service may be a presence service.

The record route may be received as a part of a service profile associated with the subscription. The subscription may be a message of an SIP session. The server may be a proxy server or a server providing a serving call state control function.

The method may comprise creating a record-route instruction for the service.

According to a still further aspect the invention provides a header for a message in a subscription service, said header including a record-route instruction, said instruction for controlling the characteristics of a network element.

In a further aspect there is provided a method of providing subscriptions comprising: establishing a subscription dialog to activate a subscription; providing a filter criteria in said subscription dialog; and adapting said filter criteria to include an instruction for a network element to selectively record the subscription route at a network element.

The network element may be a serving call state or session control function associated with a server providing the subscribed service.

The invention also provides a network element for providing subscription services, said element being adapted to receive a message including a record-route instruction, wherein responsive to said record-route instruction the network element selectively records the route of a communication session associated with said message.

BRIEF DESCRIPTION OF THE DRAWINGS

For a proper understanding of the invention, and embodiments thereof, reference is made to the accompanying drawings in which.

DETAILED DESCRIPTION OF THE PREFERRED EMBODIMENTS

Certain embodiments of the invention are described herein by way of example with reference to particular arrangements. In particular the invention is described herein by way of reference to two particular embodiments. The invention is not limited, however, to such described embodiments and/or arrangements.

Figure 1:
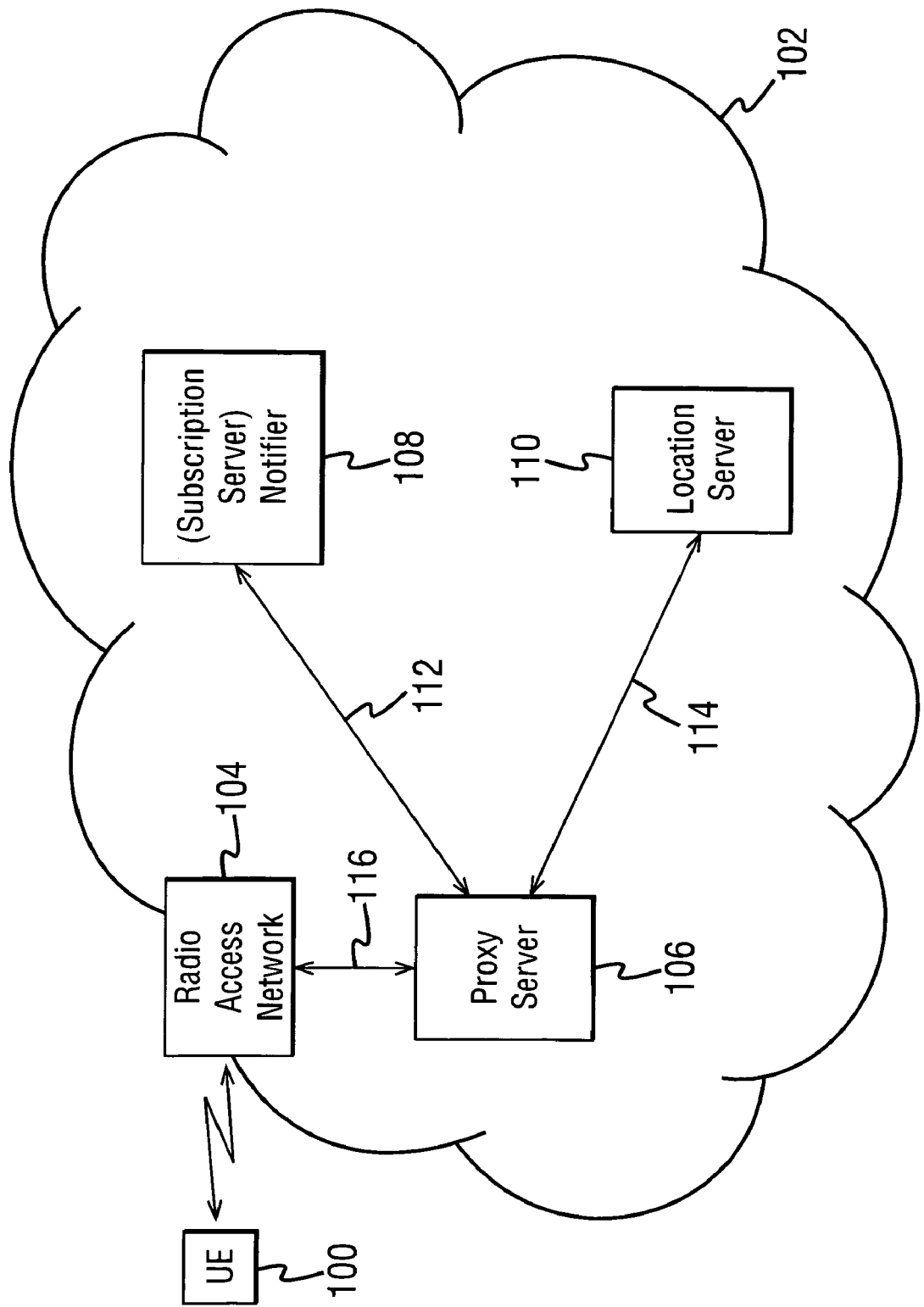
FIG. 1 illustrates a network scenario relating to a first described embodiment for an IETF (Internet Engineering Task Force) example implementation.
Figure 2:
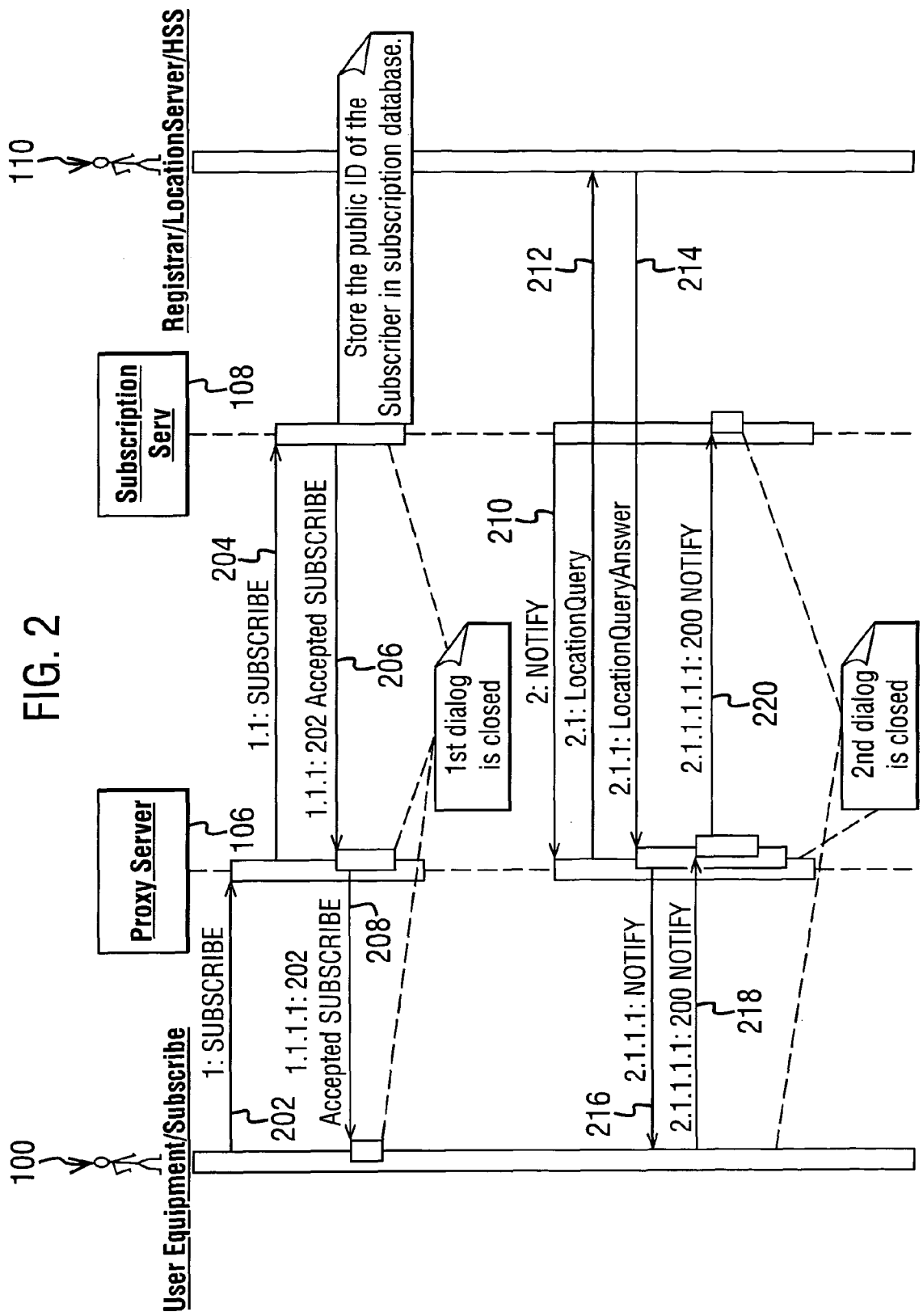
FIG. 2 illustrates a signalling arrangement in the first described embodiment for the IETF implementation.
Figure 3:
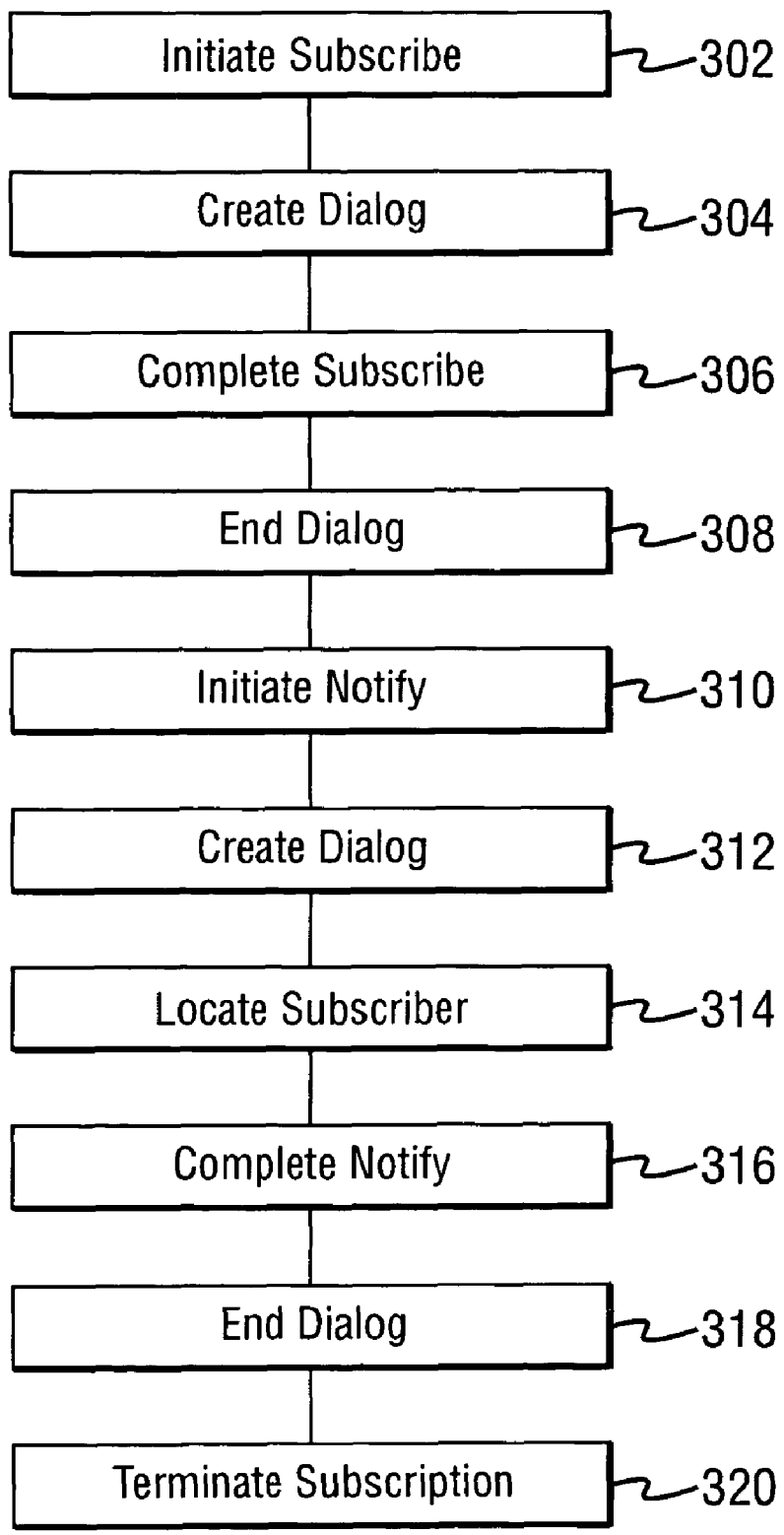
FIG. 3 illustrates the method steps in the first described embodiment for the IETF implementation.

A first embodiment of the invention is now described generally herein with reference to FIGS. 1 to 3. FIGS. 1, 2 and 3 describe the first embodiment applied to an IETF implementation.

FIG. 1 illustrates elements of a mobile communications network in which a first embodiment of the invention may be implemented. In the first embodiment, the invention relates generally to the execution of SIP-NOTIFY message routing. Such message routing may, for example, generally be implemented in a GPRS and/or UMTS communication network supporting a 3GPP all-IP architecture. Only those elements typically necessary for an understanding of this embodiment of the present invention are shown and described. Other elements that may be highly preferable or necessary for a full implementation of the network will be known to one skilled in the art.

The network is generally designated by reference numeral 102. The network 102 is generally provided with a radio access network 104 which provides access to the network for mobile devices, such as, but not limited to, user equipment (UE) 100. For the purposes of understanding the first embodiment of the invention, the network 102 is shown to include a proxy server 106 having connections 116 to the radio access network 104, a notifier 108 having connections 112 to the proxy server 106, and a location server 110 having connections 114 to the proxy server 106. The elements shown are usually at least highly preferable and in some instances are required for the purpose of SIP-NOTIFY message routing. One embodiment of the location server in the 3GPP IMS is IMR/HSS. In certain embodiments, the notifier may be referred to as a subscription server.

The first embodiment of the invention, in an IETF implementation, is further described by way of reference to the representative signalling diagram of FIG. 2 and the flow chart of FIG. 3.

In a first step 302, a subscriber associated with the UE (user equipment) 100 normally initiates a subscription to a service. The subscription initiation routinely creates a first SIP dialog as represented by step 304. A SIP SUBSCRIBE message 202 is commonly sent from the UE 100 to the proxy server 106. A SIP SUBSCRIBE message 204 is then typically sent from the proxy server 106 to the subscription server 108. The subscription server 108 then often stores the public ID (identifier) of the subscriber associated with UE 100 in its subscription database for the subscribed service.

The subscription is then normally accepted, as represented by step 306, by the subscription server 108 returning an accepted SUBSCRIBE message 206 to the proxy server 106, which, in turn, typically returns an accepted SUBSCRIBE message 208 to the UE 100. The accepted SUBSCRIBE message is a "202 Accepted Response in the example shown in FIG. 2. The message is not limited to such a format however. For example, the accepted SUBSCRIBE message may be a "200 OK" message response. The subscription is thus accepted. The subscription transaction and the first SIP dialog is thus completed. Information of the subscription is stored in the subscription server 108.

In accordance with the principles of the invention, in the first embodiment the resource for the dialog created for the subscription is then released or terminated, as represented by step 308, by the proxy server 106.

It should be noted that immediately following the accepted SUBSCRIBE message, a first NOTIFY message may have to be sent. In such case, it may be advantageous to release or terminate the dialog created for the subscription after this first NOTIFY message is sent. This is an optional feature, which may be implemented in dependence on the requirements of any particular implementation. For example, there may be implementations where no immediate NOTIFY message is required, in which case there is no advantage in maintaining the dialog until the first NOTIFY message.

At some later time, the subscription server/notifier 108 initiates a notification for the UE 100 in step 310, responsive to detection of a subscribed event. As a first step 312, the subscription server/notifier creates a second dialog with a new transaction containing a NOTIFY request. The subscription server/notifier 108 transmits a NOTIFY message 210 to the proxy server 106, identifying the subscriber associated with user equipment 100. This notify message comprises a notification of the subscribed event. Responsive thereto, in a step 314 the proxy server 106 sends a location query message 212 to the location server 110. The location server 110 returns a location query answer 214 to the proxy server 106, with the details of the location of the subscriber associated with UE 100.

The proxy server 106 then sends a NOTIFY message 216 to the UE 100. The UE returns a NOTIFY acknowledgement message 218 to the proxy server 106, which in turn returns a NOTIFY acknowledgement message 220 to the subscription server/notifier 108. A plurality of NOTIFY messages may in practice be sent from the subscriber server to the UE via the proxy server. The NOTIFY transaction and the NOTIFY dialog may be closed after termination of the initial NOTIFY transaction in step 316, but may also be continued.

If a series of messages is intended to be sent in near time, an additional header/parameter included in the NOTIFY message may instruct the proxy server and subscription server as to whether to close the notification dialog. This header/parameter is preferably not mixed with the existing "Subscription State: Terminated" parameter of the NOTIFY message that instructs the UE 100 of termination of the subscription. The termination of the subscription is shown in step 320 of FIG. 3.

When the NOTIFY dialog is terminated step 318 is reached. The NOTIFY dialog must be terminated before, or in conjunction with, the termination of the subscription.

As can be understood from the above, there is no requirement for the proxy server 106 to store any details associated with dialogs outside of an active session. Once a subscription is established, the proxy server has no details of the subscriber stored therein. The proxy server uses the location server to locate the subscriber when a notification is needed. As such, the proxy server does not store a so-called 'route record' for a subscriber. The proxy server is used during an active dialog, but once such dialog is no longer active stores no detail.

In FIG. 1, only one proxy server is shown for simplicity. In a practical 3GPP implementation, multiple proxy servers may be involved, as may multiple call state or session control functions (CSCFs) associated with such proxies. The principle of not storing non-active dialogs may apply to all such proxies and CSCFs. However, in certain cases retention of an inactive dialog may be desirable.

The prevention of the retention of the dialog outside of an active session may be achieved in a number of ways. For example:

1. There may be provided a new or adapted SIP message, in which the fact that the retention of the dialog is or is not required in the proxy server is indicated in the message.
2. An additional header may be provided to the existing SUBSCRIBE message, which header indicates whether the proxy server should maintain or release the dialog on completion of a subscription or notification session.
3. A value of the existing SIP header in a SUBSCRIBE message may be utilised to indicate whether the proxy server should maintain or release the dialog on completion of a subscription or notification session.
4. Record-routing may be automatically omitted by default in SIP proxies, in IMS entities or non-IMS entities. Such technique requires the adaptation of the elements.

Although the dialog resources are released in the proxy server(s) or CSCF(s), the subscription is still active in the subscription server/notifier. The subscription server/notifier therefore sends a NOTIFY message to the proxy server in the usual way when new subscribed information is to be issued to the subscriber/user equipment. No modification of the subscription server/notifier is therefore necessary. The NOTIFY message may be sent as a regular or single transaction. Alternative SIP requests to the NOTIFY message may be used. The embodiment proposes only changes to the retention of dialog in the proxy or CSCF entity.

In accordance with this embodiment of the invention, the fact that the proxy server (or equivalent functional entity) releases the subscriber dialog is compensated for by accesses to the location server, or other registrar or location functionality service, to provide the location to the proxy server (or equivalent functional entity) when a notification is required.

The proxy server 106 is normally effectively a connection processing server (CPS) for the purpose of establishing the dialog between the user equipment and the subscription server 108. According to certain embodiments, the CPS is preferably part of the session controller subsystem.

This first embodiment of the invention preferably offers the significant advantage of freeing up the resources of the proxy server. The proxy server, and hence the connection processing server, is generally otherwise severely restricted by having to store dialog and/or record-routes.

It should be noted that the first embodiment of the invention, described with reference to FIGS. 1 and 2, is an illustrative example of a possible implementation of the invention. More specifically, the example relates to a scenario where subscribers subscribe to presence information in a single network. It should be noted, however, that the first embodiment of the invention is not limited in its applicability simply to such a network scenario. The principles of the first embodiment of the invention may also extend to scenarios where a 'watcher' is located outside of the presentity's home network. In such scenarios, the subscription server or notifier 108 may send a NOTIFY message directly to a proxy in the watcher's home network, rather than to the proxy server 106 of FIG. 1. The NOTIFY message preferably includes the watcher's identity, stored during the subscription procedure. Once the NOTIFY message is received by the proxy in the watcher's home network, a query may be done to a location server in the watcher's home network and the routing of the NOTIFY message is preferably consistent with the normal terminating routing known in the art.

Thus, in general, in accordance with the principles of the present invention as discussed in relation to the first embodiment, when a NOTIFY message is generated by a notifier, to notify of a subscribed event, a NOTIFY message is sent toward a proxy of the target network specified with the watcher's identity, stored during the subscription. This proxy may be a proxy server of the watcher's home network and is capable to find the location of the watcher.

Figure 4:
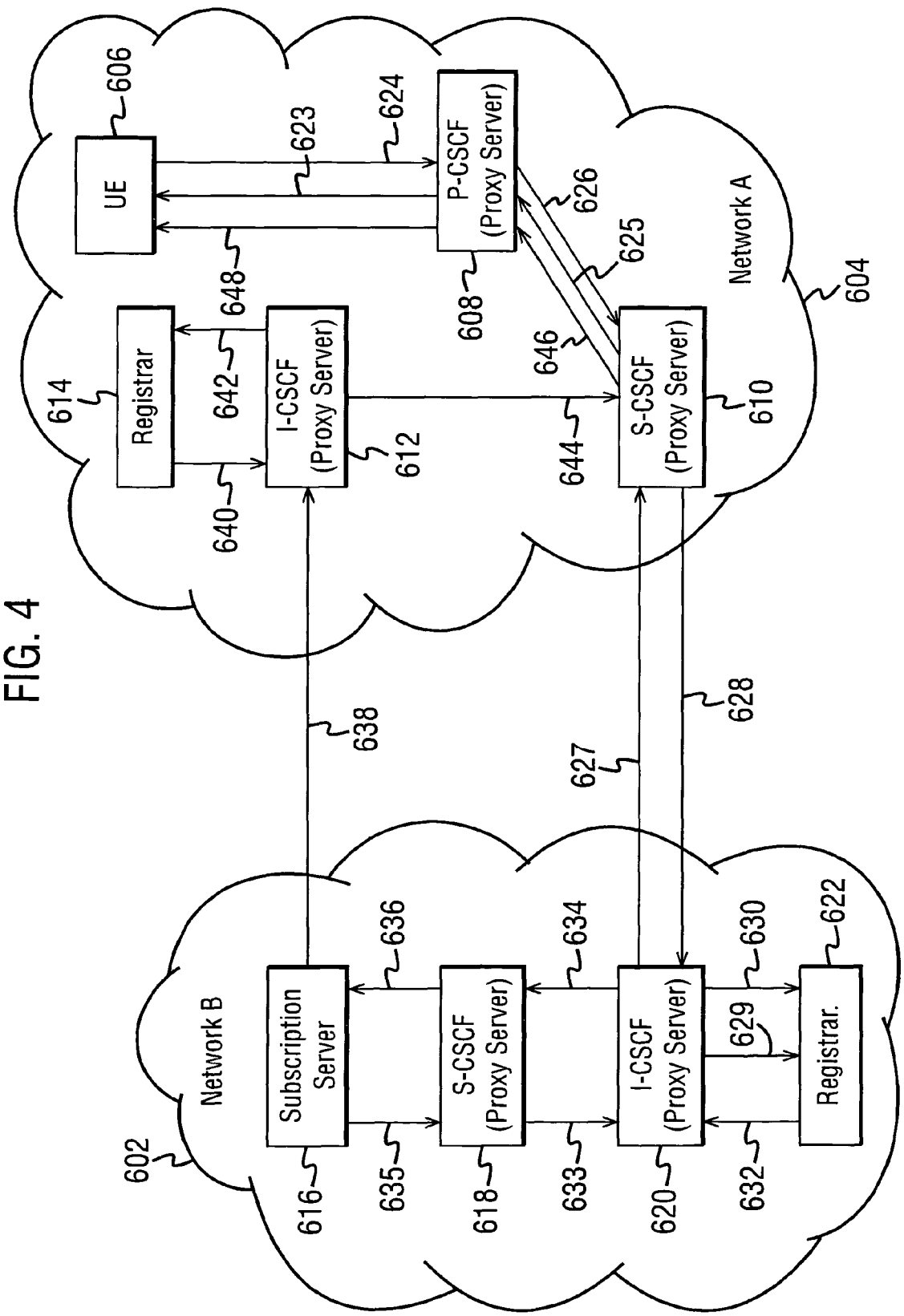
FIG. 4 illustrates a network scenario relating to a second described embodiment for an IMS (IP Multimedia Subsystem) example implementation.
Figure 5:
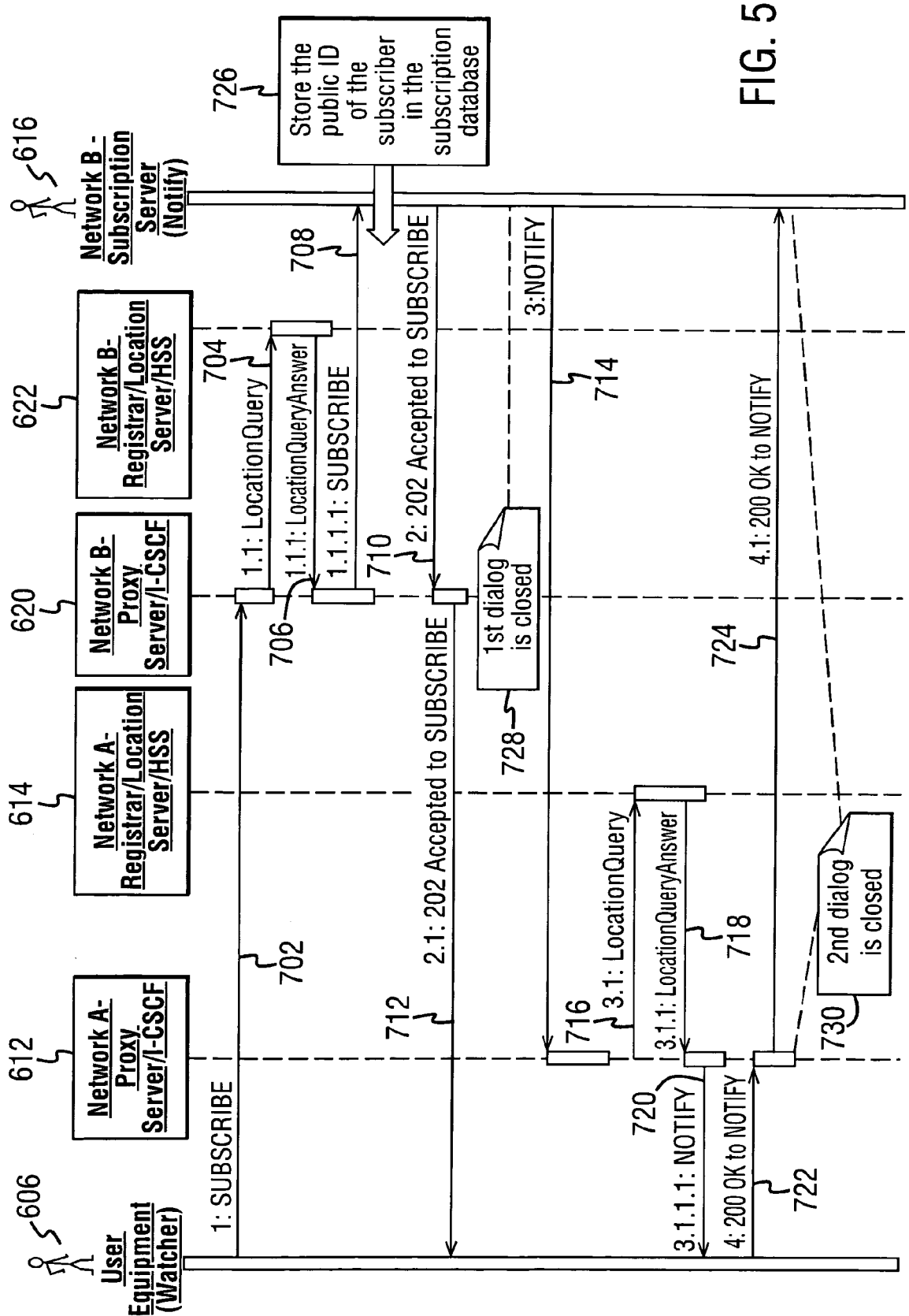
FIG. 5 illustrates an overview of a signalling arrangement in the second described embodiment for the IMS implementation.

In the following description, this generalisation is applied to an IMS environment as illustrated in FIGS. 4 and 5, which illustrate a second embodiment of the invention as applied to an IMS environment.

The principles of the first embodiment of the invention may also extend to scenarios in an IMS network where a 'watcher' is located outside of the presentity's home network. In such scenarios, the subscription server or notifier 108 may send a NOTIFY message directly, or via a proxy, to a proxy in the watcher's home network, (rather than to the proxy server 106 of FIG. 1). As illustrated in FIG. 4, in the case of IMS this proxy in the watcher's home network may be an entry point proxy e.g. an interrogating call state or session control function (I-CSCF). The NOTIFY message preferably includes the watcher's identity, stored during the subscription procedure. Once the NOTIFY message is received by the entry point proxy, e.g. I-CSCF, a query may be done to a location server, e.g. HSS, in the watcher's home network and the routing of the NOTIFY message is preferably consistent with the normal terminating routing in IMS as known in the art.

FIG. 4 illustrates elements of a mobile communications network in which the second embodiment of the invention may be implemented. Only those elements typically necessary for an understanding of this embodiment of the present invention are shown and described. Other elements that may be highly preferably or necessary for a full implementation of the network would be known to one skilled in the art. FIG. 5 is a signalling diagram further illustrating aspects of the second embodiment. In the signalling diagram of FIG. 5, all the network elements of FIG. 4 have not been included so as to reduce the complexity of the figure. The relationship between the signalling diagram of FIG. 5 and the network implementation of FIG. 4 will become apparent in the following description.

Referring to FIG. 4, there is generally illustrated a network 604, designated network A, of a UE 606 being a watcher or subscriber to presence services. There is further illustrated a network 602, designated network B, being a home network of a subscription service provider to which the watcher associated with UE 606 subscribes.

The home network of the watcher, UE 606, includes a P-CSCF 608, a S-CSCF 610, a I-CSCF 612, and a registrar 614. The home network 602 of the presence services provider includes a subscription server 616, a S-CSCF 618, a I-CSCF 620, and a registrar 622. It should be noted that the registrars 622 and 614 of each of the network 602 and 604 respectively may be a location server or a home subscriber server, suitable for providing location information of an element connected with the respective network.

The second embodiment of the invention is now further described by way of further reference to FIGS. 4 and 5. Turning first to FIG. 4, the watcher, UE 606, first subscribes to presence services associated with the subscription server 616.

To achieve this, the UE 606 transmits a SUBSCRIBE message, as denoted by signal 624 in FIG. 4, to the P-CSCF 608, being the P-CSCF associated with the UE 606. The SUBCRIBE message is then transmitted, as denoted by signal 626, from the P-CSCF 608 to the S-CSCF 610, the S-CSCF 610 being the home S-CSCF associated with the UE 606. The S-CSCF 610 then transmits the SUBSCRIBE message, as denoted by signal 628, to the I-CSCF 620 of the network 602. The transmission of the SUBSCRIBE message to the I-CSCF of the network with which the subscription server is located is known in the art. As such, in the signalling diagram of FIG. 5, the transmission of the SUBSCRIBE message from the UE 606 to the I-CSCF 620 is denoted by a single signal 702.

Referring again to FIG. 4, on receipt of the SUBSCRIBE message the I-CSCF 620 sends a location query message to the registrar 622, as denoted by signal 630. The location query message is denoted by signal 704 in FIG. 5. Responsive thereto, the registrar 622 returns a location query answer to the I-CSCF 620, as denoted by signal 632 in FIG. 4. The location query answer is denoted by signal 706 in FIG. 5.

The registrar 622 returns to the I-CSCF 620 the identity of the S-CSCF that may be used to route the SUBSCRIBE request to the subscription server, being the identity of the S-CSCF 618. The I-CSCF 620 therefore forwards the SUBSCRIBE message to the S-CSCF 618, as denoted by signal 634, which in turn forwards the SUBSCRIBE message to the subscription server 616, as denoted by signal 636. Referring to FIG. 5, the transmission of the SUBSCRIBE message from the I-CSCF 620 to the subscription server 616 is denoted by a single signal 708.

On receipt of the SUBSCRIBE message the subscription server 616 registers the UE 606 for presence services, and the UE 606 becomes a subscriber of the subscription server 616. As denoted by block 726 in FIG. 5, the subscription server 616 stores the public identity of the subscriber in its subscription database. Thereafter, an 202 Accepted to SUBSCRIBE message is transmitted back to the user equipment 606 via the same path as the SUBSCRIBE message was transmitted, as denoted by signals 635, 633, 627, 625 and 623 in FIG. 4. Similarly in FIG. 5, the return path of the Accepted to SUBSRIBE message is generally designated by signal 710 and 712.

At this stage, subscription to the presence services is completed. In accordance with the techniques of the present invention, the dialog created for the subscription is released or terminated. This is denoted in FIG. 5 by block 728.

At some stage thereafter, the subscription server 616 needs to notify the watcher of presence activity, and a new dialog must be initiated. The subscription server 616 therefore generates a NOTIFY message for transmission to the UE 606. Having stored the public identity of the subscriber in its database, the subscription server 616 transmits the NOTIFY message directly to the I-CSCF 612 of the watchers network 604, as denoted by signal 638 in FIG. 4. This is similarly denoted in FIG. 5 by signal 714.

The I-CSCF 612 then sends a location query signal to the registrar 614, as denoted by signal 640, which returns a location query answer to the I-CSCF 612 as denoted by signal 642. In FIG. 5, the location query to the registrar 614 from the I-CSCF 612 is denoted by signal 716, and the location query answer is denoted by signal 718.

Thereafter, the I-CSCF 612 forwards the NOTIFY message to the S-CSCF 610, the identity of which is provided by the registrar 614. The forwarding of the NOTIFY message to the S-CSCF 610 is denoted by signal 644 in FIG. 4. The S-CSCF 610 then forwards the NOTIFY message to the P-CSCF 608 associated with the UE 606, which in turn forwards the NOTIFY message to the UE 606 as denoted by signal 648. The forwarding of the NOTIFY message from the I-CSCF 612 to the UE 606 is denoted by a single signal 720 in FIG. 5.

Thereafter, the UE 606 acknowledges receipt of the NOTIFY message to the subscription server 616 as is known in the art. As is illustrated in FIG. 5, the UE 606 returns a 200 OK to NOTIFY message to the I-CSCF 612 as denoted by signal 722. In practice this message follows the return path, through the P-CSCF 608 and S-CSCF 610. The I-CSCF 612 then forwards the 200 OK to NOTIFY message to the subscription server 616, as denoted by signal 724 in FIG. 5.

As denoted by block 730 in FIG. 5, the further dialog opened to provide a notification to the watcher is then released or terminated.

Thus, in general, in accordance with the principles of the present invention as discussed in relation to the first embodiment, when a NOTIFY message is generated by a notifier, to notify of a subscribed event, a NOTIFY message is sent toward an I-CSCF of the target network specified with the watcher's identity, stored during the subscription. The I-CSCF may be a proxy server of the watcher's home network.

Figure 6:
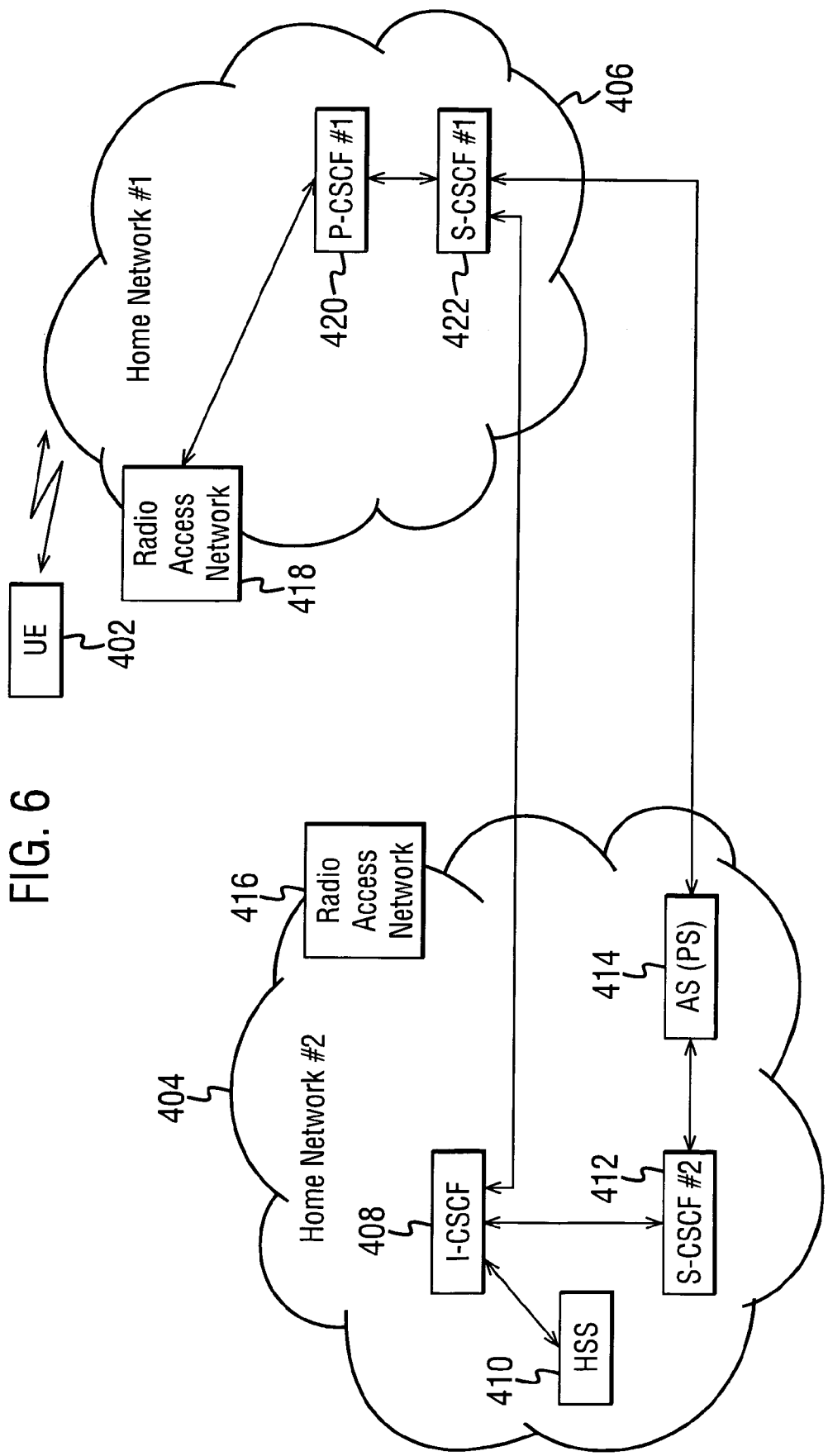
FIG. 6 illustrates a network scenario relating to a third described embodiment.
Figure 7:
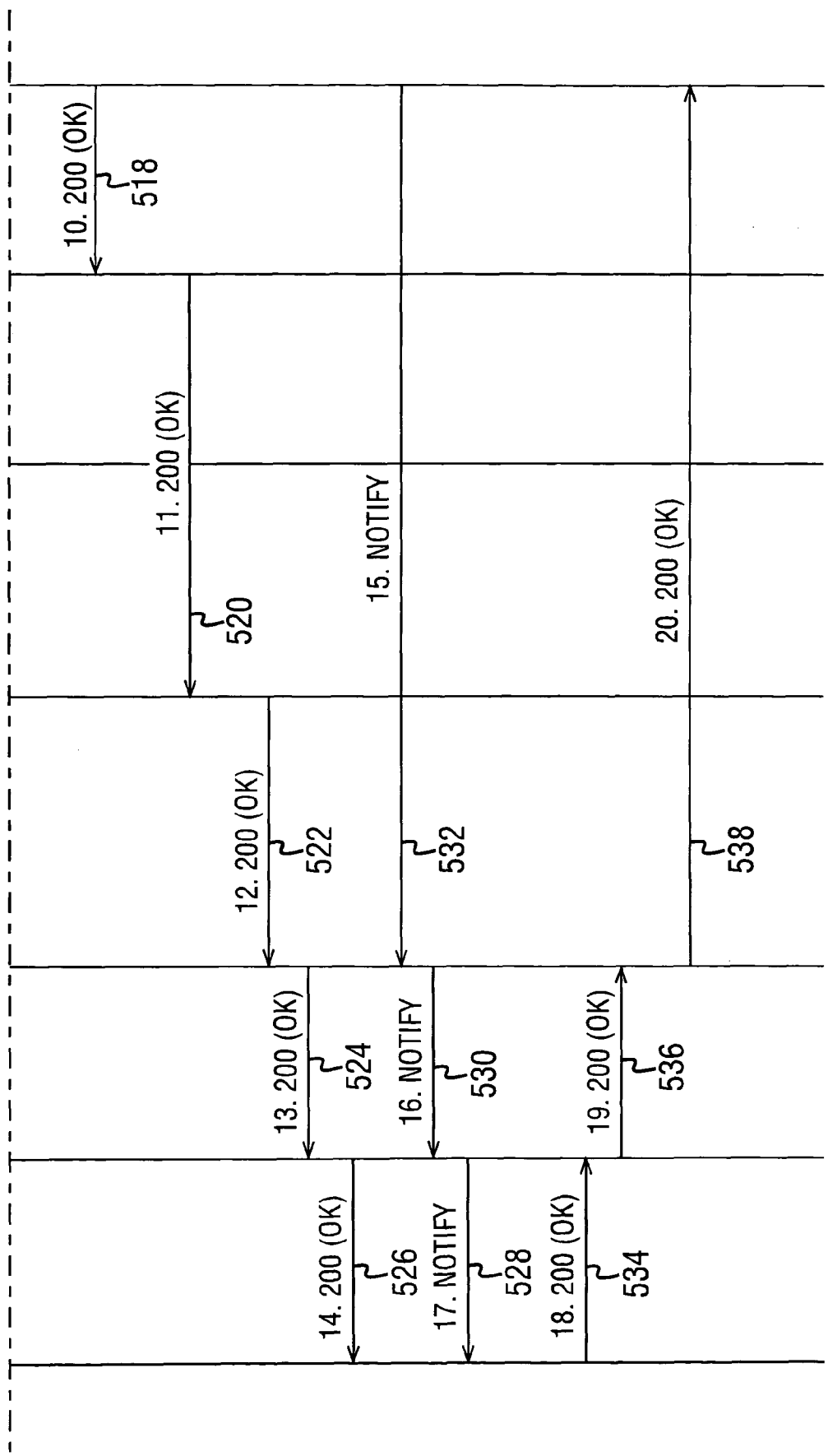
FIG. 7 illustrates a signalling arrangement in the third described embodiment.

A third embodiment of the invention is now described herein with reference to FIGS. 6 and 7.

FIG. 6 illustrates typical elements of a mobile communications network in which a second embodiment of the invention may be implemented. In the second embodiment, the invention again generally relates to the execution of SIP-SUBSCRIBE and SIP-NOTIFY message routing. Such message routing may again be implemented in a GPRS or UMTS communication network supporting a 3GPP all-IP architecture. Only those elements necessary for an understanding of embodiments of the present invention are shown and described. Other elements that may be necessary for a full implementation of the network will be known to one skilled in the art.

In the embodiments described hereinabove with reference to FIG. 1, a simple example was described in which the user equipment and a subscription server were connected in a common network. In the embodiment of FIG. 6, an example is shown in which the user equipment and the subscription server (or application server) are connected in different networks.

Referring to FIG. 6, two networks are shown. A first network 406 is a home network ('home network #1') for a user equipment (UE) 402 associated with a watcher. A watcher is a term generally used to describe a subscriber to presence services. A second network 404 ('home network #2') is a home network for a presentity. A presentity is a term generally used to describe an entity providing presence services. The presentity is represented by a presence server application running on the application server (AS) 414. In the described embodiment, the application server 414, which generally can be considered to provide application services, provides a presence service, and may therefore be considered to be a presence server (PS).

The first home network 406 includes a radio access network 418 connected to a first proxy call state or session control function (P-CSCF#1) 420, which in turn is connected to a first serving call state or session control function (S-CSCF#1) 422.

The second home network 404 also includes a radio access network 416. An interrogating call state or session control function (I-CSCF) 408 is connected to a HSS (Home Subscriber Server) 410 and a second serving call state or session control function (S-CSCF#2). The second serving call state or session control function (S-CSCF#2) is connected to the application server 414.

Referring to the signalling chart of FIG. 7, the implementation of the invention in accordance with the second embodiment is further described. The UE 402, which as stated hereinabove in terms of presence services can be considered to be a watcher (or subscriber to presence services) sends a subscription request message towards the application server 414. The subscription request contains the public user identity of the user to whose presence information the watcher wants to subscribe.

The subscription request involves transmission of a SIP-SUBSCRIBE message 502 from the UE 402 to the P-CSCF#1 420 of the user's home network, and a SIP-SUBSCRIBE message 504 from the P-CSCF#1 420 of the subscriber's home network to the S-CSCF#1 422 of the subscriber's home network. P-CSCF#1 420 may be located in the user's home network or outside the user's home network in a visited network, e.g. in case the user is roaming outside his home country.

At the S-CSCF#1 422, an evaluation of the initial filter criteria for the subscription is carried out, in accordance with routing principles for the ISC interface in the IP Multimedia Subsystem.

A SIP-SUBSCRIBE message 506 is then further sent from S-CSCF#1 422 of the subscribers home network to the I-CSCF 408 of the second home network, i.e. the presentity's home network, via the IMS based on the public user identity of the user to whose presence information will be subscribed. A SIP-SUBSCRIBE message 510 is then forwarded to the S-CSCF#2 412 of the presentity's home network based on information received as a response to a location query 508 sent to the HSS 410.

Prior to receipt of the SIP-SUBSCRIBE message, the S-CSCF#2 412 may receive from the HSS 410 a filter criteria for the subscriber (presentity) to whose presence information the watcher wants to subscribe to. The filter criteria may include the record-route information for the subscriber. Thus prior to receipt of a subscription message, the S-CSCF#2 preferably has already received the record-route information for the subscriber.

However, this is not necessarily the case in all embodiments. In other embodiments a particular S-CSCF may receive the subscription message first, and then fetch the record-route information included in, for example, the filter criteria.

In any event, the S-CSCF#2 412 receives the filter criteria, including the record-route instructions, preferably included in the user profile, for the subscriber (presentity) whose presence information the watcher wants to subscribe to. This is received from the HSS 410 in one embodiment. Thus the record-route instructions for a subscriber may be stored in the HSS in an embodiment. When a message is received by the S-CSCF#2 412, or more generally a proxy server, then the proxy server may choose whether to implement record-route based on the received filter criteria. In an alternative arrangement, the I-CSCF 408 may fetch the filter criteria for the S-CSCF#2.

At S-CSCF#2 412, a further evaluation of the initial filter criteria is carried out, in accordance with the proposed techniques for presence services familiar to one skilled in the art. The further evaluation of the initial filter criteria involves the S-CSCF#2 412 validating the service profile of the subscriber. In accordance with this second embodiment of the invention, the filter criteria for the subscriber request is adapted to include an indication as to whether the S-CSCF#2 412 is to create a 'record-route' entry for the subscription when not active. The filter criteria may instruct the S-CSCF#2 as to the application server to which the subscription request be routed, but with an instruction not to record the route.

In the proposals for presence services in the art, it has already been proposed that it is not necessary for a S-CSCF to record-route all SIP dialog creating requests. In presence services, in particular, the presentity's S-CSCF is intentionally left out from the presence SUBSCRIBE dialog in order to avoid static allocation of S-CSCFs. Due to an emerging number of new event packages, it is increasingly important to ensure that S-CSCFs makes appropriate decisions as to whether or not to record-route SIP dialog. It is important that a S-CSCF does record-route when it is necessary to do so, but in order to maximise system resources it is also important that the S-CSCF does not unnecessarily record routes. This problem is particularly evident where the S-CSCF acts as a SIP proxy server in a SIP dialog.

Thus in the second embodiment described the S-CSCF#2, which routes the subscription message to the application server, uses the initial filter criteria to make routing decisions on the ISC interface. In accordance with the principles of the present invention, the initial filter criteria may be extended to instruct S-CSCF#2 as to its record-route behaviour. The initial filter criteria may be service specific, and therefore it is an appropriate place to add information as to whether the S-CSCF should record-route or not.

For example, in the case of a presence service, in flow 6.1.2.1 of TR 24.841 0.5.0, step 7, the behaviour with the extended initial filter criteria may be:

S-CSCF#2 validates the service profile of this subscriber and evaluates the initial filter criteria. For sip:user2_public1@home2.net S-CSCF#2 has termination initial filter criteria with service points of interest of Method=SUBSCRIBE and Event='presence' and action='create Record-Route entry: no' that informs the S-CSCF to route the SUBSCRIBE request to the Application Server ps.home2.net and do not create a Record-Route entry for the request.

The S-CSCF#2 412 then forwards a SIP-SUBSCRIBE message 514 to the application server 414. As represented by block 516, a watcher authorisation is then established for the subscriber associated with UE 402, as known in the art.

A series of SIP 200 OK message then follow the same route in reverse back to the UE, to indicate completion of the subscription set-up: this is represented by messages 518, 520, 522, 524, 526.

Subsequent thereto, the application server notifies an event to the subscriber. As shown in FIG. 7, the application server sends a SIP-NOTIFY message 532 directly to the S-CSCF#1 422 of the UEs home network on the IMS, which in turn sends a SIP-NOTIFY message 530 to the P-CSCF#1, which in turn sends a SIP-NOTIFY message 528 to the UE 402. A series of SIP-200 OK messages follow the reverse route: this is represented by SIP 200 OK messages 534, 536 and 538. Thus the application server sends the SIP-NOTIFY message directly to the S-CSCF#1 of the subscriber's home network, not via the route through which the subscription was set-up and acknowledged.

Thus in the embodiment of subscription services in-the scenario where a subscriber connected in one network ("connected network") subscribes to a service provider connected in another network ("services network"), there is no requirement for any proxy or CSCF in the services network to retain record-route information.

The S-CSCF of the services network may or may not retain record-route information. If the record-route information is not retained, then S-CSCF#2 is dropped from the path of routing notifications, i.e. notifications are not routed via S-CSCF#2.

In the embodiment of FIG. 6, it is described hereinabove that the S-CSCF#2 412 receives from the HSS 410 a filter criteria for the subscriber whose presence information the watcher wants to subscribe to. This filter criteria may be automatically provided by the HSS 410, or may be retrieved from the HSS 410. In the embodiment described above, the filter criteria includes record-route instructions, which indicate whether the S-CSCF#2 412 is to record-route the SIP dialog for that subscriber.

A refinement of this aspect of the embodiment of FIG. 6 is now described, specifically a refinement in relation to the filter criteria supplied to the S-CSCF#2 412 or configured in the S-CSCF#2 412. In this refinement, in addition to a subscriber filter criteria for each subscriber, a system filter criteria is introduced into the IMS. The system filter criteria is not associated with any specific subscriber. There may be provided an overall system filter criteria for all messages in all cases. Alternatively, there may be provided system filter criteria which apply to all subscriptions of a particular type, or all subscriptions at a particular point in the system. There may exist, for example, distinct system filter criteria for the UE originating case, the terminating registered case, the AS originating case, the terminating unregistered case, or any other case. The four cases set out above are defined below.

The UE originating case refers to the message flow to the user's home S-CSCF in his home network, where the message flow is from the user equipment, to the proxy CSCF (located in a visited network or in the user's home network), to the serving CSCF of the user's home network and toward the application server, or the reverse flow. In the arrangement of FIG. 1 where the user equipment and the application server are connected in the same network, all messages fall within the originating case. In FIG. 6, the originating case refers to the messaging in the first home network 406.

The terminating registered case refers to the message flow in the application's home network, generally from an interrogating CSCF of the application's home network, to a serving CSCF of the application's home network, and to the application server, or the reverse flow. In FIG. 6, the terminating case refers to the messaging in the second home network 404.

The AS originating case refers to the message flow in the user's home network where the originator is an application server. The message flow is from the AS to the serving CSCF of the user's home network and optionally toward another application server, or the reverse.

The terminating unregistered case refers to the message flow in the application's home network where the target identity, e.g. the user equipment, is not registered. As in the terminating registered case, the message flow is from an interrogating CSCF of the application's home network, to a serving CSCF of the application's home network, and to the application server, or the reverse. In FIG. 4, the terminating case refers to the messaging in the second home network 404.

The system filter criteria may contain one or more system filter criteria for each or all of the UE and AS originating and terminating registered and unregistered cases set out above, such that different system filter criteria are possibly applied in each type of case. Alternatively, system filter criteria may be common to one or more of the described cases.

In general the system filter criteria may be considered to comprise configuration data of the operator's IMS network relating to one or more S-CSCFs in the operator's IMS network.

All the system filter criteria, or part thereof, may be configured on, or provided to, one or more S-CSCFs and/or the whole system filter criteria, or part thereof, may be loaded into one or more S-CSCFs from a database, and/or from a table, and/or from a list, and/or from a file and/or from a similar source common to one or more S-CSCFs. Any such system filter criteria may be located on one or more S-CSCFs and/or on any other network entity and/or anywhere in the network.

When the entire system filter criteria, or part thereof, is configured on a S-CSCF, the configuration may be done before and/or under and/or after the initiation of the S-CSCF and/or when needed. When the entire system filter criteria, or part thereof, is loaded on a S-CSCF, the loading may be done before and/or under and/or after the initiation of the S-CSCF and/or when needed.

The use of the system filter criteria enables any particular individual subscriber filter criteria to override or to be overridden. For example, the network may be configured such that it is required that no S-CSCFs should retain record-routes. However, the subscriber filter criteria set associated with a particular subscriber may indicate that the S-CSCF associated with the establishment of the dialog session should retain the record-route. The use of the system filter criteria set enables such specific subscriber filter criteria information to be overridden, such that the network retains control of the network configuration. By way of another example, the network may be configured such that it is required that no S-CSCFs should retain record-routes. However, the subscriber filter criteria set associated with a particular subscriber may indicate that the S-CSCF associated with the establishment of the dialog session should retain the record-route. The use of the system filter criteria set enables definition of a default (i.e. not to record the route) such that specific subscriber filter criteria information may override the default.

A subscriber filter criteria may state that for subscription to a presence event, no record-route entry should be created. This could be defined in the initial subscriber filter criteria, for example, as follows (taken from TR 24.841 ver. 1.0.0 sub clause 6.1.2.1):

Method=SUBSCRIBE and Event='presence' and
        action='create record-route entry: no'.

In order to ensure that for each subscriber event no record-route is retained, it is necessary for such subscriber filter criteria to be defined in every session of every subscriber.

As a more efficient way of ensuring consistent operation in the network, a system filter criteria may be defined which is applicable to all requests for subscribing to presence information, for example, as follows:

Method=SUBCRIBE and Event='presence' and
        action='create record-route entry: no'.

This single system filter criteria may be stored and/or configured in any one of the HSS 410, S-CSCF 412, or in any other network entity or in any database as a single filter criteria, but applied to all subscriber sessions. This single system filter criteria may be stored and/or configured as a single filter criteria or it may be part of a stored and/or configured filter criteria set. The format and content of the stored and/or configured single system filter criteria may or may not be the same as that for a subscriber filter criteria.

This then allows for the subscriber filter criteria to be simplified. The subscriber filter criteria in the service profile of all users wanting to subscribe to presence information may be simplified, for example, to:

Method=SUBCRIBE and Event='presence'.

Thus, this refinement of embodiments of the present invention allows the general functionality of the filter criteria relating to whether the record-route should be retained or not to be described only once, in a system filter criteria, thus avoiding the need for inserting it into the filter criteria of every single subscriber. Advantageously, this saves space in the HSS. The single system filter criteria is much easier to maintain than a large quantity of subscriber specific filter criteria.

In implementing the system filter criteria, it may also be necessary to implement priority rules for dealing with any conflict between a system filter criteria and a subscriber filter criteria, where both exist for any particular session. In such cases the implementation may combine both filter criteria into a new applicable filter criteria so that the data in the system filter criteria overrides the corresponding data in the subscriber filter criteria or so that the data in the subscriber filter criteria overrides the corresponding data in the system filter criteria. The new applicable filter criteria may then be used instead of the conflicting system and subscriber filter criteria.

A first example implementation may be that system filter criteria overrides subscriber filter criteria. In this implementation, the S-CSCF, such as the S-CSCF 412, may first evaluate the subscriber filter criteria. When a match is found for that subscriber for the particular subscriber session, that subscriber filter criteria is picked up to be applied.

Thereafter, the system filter criteria may be evaluated as a separate set. When a match is found for the system filter criteria for the particular subscriber session, then the system filter criteria set is picked up to be applied.

The evaluation order may also be: first system filter criteria then subscriber filter criteria.

If both the filter criteria picked up, i.e. the system filter criteria set and the subscriber filter criteria set, contain the same data, e.g. value(s), parameter(s) or similar (for example variable, entry, list, data, field, table, etc.), the data of the system filter criteria may override the data in the subscriber filter criteria, and the data of the system filter criteria is applied rather than the data in the subscriber filter criteria.

A second example implementation may be that subscriber filter criteria overrides system filter criteria. In this implementation, the S-CSCF, such as the S-CSCF 412, may first evaluate the system filter criteria. When a match is found for the system filter criteria for the particular subscriber session, that system filter criteria is then picked up to be applied.

Thereafter, the subscriber filter criteria may be evaluated as a separate set. When a match is found for the subscriber filter criteria for the particular subscriber session, then that subscriber filter criteria is picked up to be applied.

The evaluation order may also be: first subscriber filter criteria then system filter criteria.

If both the filter criteria picked up, i.e. the system filter criteria and the subscriber filter criteria, contain the same data, e.g. value(s), parameter(s) or similar (for example variable, entry, list, data, field, table, etc.), the data of the subscriber filter criteria overrides the data in the system filter criteria, and the data of the subscriber filter criteria is applied rather than the data in the system filter criteria.

In a third example implementation, instead of the general priority rules the individual priority rules may be implemented in the filter criteria and used when they are needed. For example a system filter criteria may contain an indication that its data overrides the corresponding data of the subscriber filter criteria or is overridden by the corresponding data of the subscriber filter criteria with the same priority. Alternatively a subscriber filter criteria may contain an indication that its data overrides the corresponding data of the system filter criteria or is overridden by the corresponding data of the system filter criteria with the same priority.

In a fourth example implementation a combination of general and individual priority rules may be used. For example a default may be that the data of the subscriber filter criteria overrides (or alternatively is overridden by) the corresponding data of the system filter criteria except when otherwise explicitly specified in system filter criteria or subscriber filter criteria.

In the above example, for the terminating subscriber filter criteria, i.e. the subscriber filter criteria for the terminating case, the subscriber terminating filter criteria may be applied as well as the terminating system filter criteria, i.e. system filter criteria for the terminating case, if there exists separate system filter criteria for the different cases (e.g. originating and terminating).

Modifications to such rules for applying the filter criteria may be provided in different implementations, according to network requirements. Various combinations and adaptations of such rules are possible.

In the examples above only the essential parts of the filter criteria are shown and others are omitted for the sake of clarity.

It should also be noted that although in the above example there is described that the system filter criteria and/or subscriber filter criteria may be provided, in embodiments only the system filter criteria may advantageously be provided. For example, if all subscribers subscribe to presence services, then the necessary filter criteria may be handled by the system filter criteria, with no requirement for the provision of any subscriber filter criteria.

In the UE originating case in the example of FIG. 6, in the route from the user equipment, to the P-CSCF, to the S-CSCF, and to the application server, the system filter criteria may define that the record-route entry must be inserted in the S-CSCF, so that the S-CSCF may remain in the originating path. At the same time, the system filter criteria may define that there is no requirement for record-route entry to be maintained for the terminating case.

The second and third embodiment with their refinements, as discussed in relation to FIGS. 4 and 5 as well as FIGS. 6 and 7, are more generally applicable than to routing subscriptions. They may be applied to any routing case where a decision is needed as to whether to retain record-route information in the S-CSCF.

In the embodiments above AS, S-CSCF, P-CSCF and I-CSCF are examples of SIP proxy servers.

Certain embodiments of the invention have been described herein by way of example with. One skilled in the art will appreciate that the invention is not limited in its applicability to such embodiments. The scope of protection afforded by the invention is defined by the appended claims.

We claim:

1. A method, comprising:
receiving at an apparatus a subscription request for subscription services, wherein the apparatus comprises a serving call state or session control function associated with a server providing a subscribed service;
receiving at the apparatus an instruction to record or not to record a route of a communication session associated with the subscription request, the instruction being part of a filter criteria;
selectively recording the route of the communication session associated with the subscription request, with a processor of the apparatus, in dependence on the instruction to record the route; and
selectively not recording the route of the communication session associated with the subscription request, with a processor of the apparatus, in dependence on the instruction not to record the route; and
wherein the filter criteria comprises a subscriber specific filter criteria, and in response to the subscriber specific filter criteria matching a system specific filter criteria, applying a combination of both the system specific filter criteria and the subscriber specific filter criteria.

2. A method according to claim 1, wherein the receiving an instruction comprises receiving the instruction to record or not to record the route as part of a system filter criteria.

3. A method according to claim 2, wherein the system filter criteria is configured for all subscribers.

4. A method according to claim 2, wherein the system filter criteria is pre-configured in the apparatus.

5. A method according to claim 2, wherein the system filter criteria is loaded into the apparatus from a network element.

6. A method according to claim 5, wherein the network element comprises one of a home subscriber server, another serving call state or session control function, or a database.

7. A method according to claim 1, wherein the system specific filter criteria is configured to override the subscriber specific filter criteria.

8. A method according to claim 1, wherein the subscriber specific filter criteria is configured to override the system specific filter criteria.

9. A method according to claim 1, wherein any filter criteria is service specific.

10. A method according to claim 9, wherein the service is a presence service.

11. A method according to claim 2, wherein the receiving an instruction comprises receiving the instruction to record or not to record the route as a part of a service profile associated with the subscription request.

12. A method according to claim 1, wherein the subscription request is a message of a session initiation protocol session.

13. A method, comprising:
determining at an apparatus that a network entity is required to record or not to record a route of a communication session associated with a subscription request for a server providing a subscribed service; and
sending from the apparatus to the network entity, in response to said determination, a filter criteria comprising an instruction to record or not to record the route of the communication session, the instruction to record or not to record the route indicating whether the network entity is to record or is not to record the route, wherein the filter criteria comprises a subscriber specific filter criteria and a system specific filter criteria, the filter criteria indicating the network entity, in response to the subscriber specific filter criteria matching the system specific filter criteria, is to apply a combination of both the system specific filter criteria and the subscriber specific filter criteria.

14. An apparatus, comprising:
a processor configured to:
receive a subscription request for subscription services, wherein the processor is configured to provide in the apparatus a serving call state or session control function associated with a server providing a subscribed service;
receive an instruction to record or not to record a route of a communication session associated with the subscription request, the instruction being part of a filter criteria;
selectively record the route of the communication session associated with the subscription request in dependence on the instruction to record the route; and
selectively not record the route of the communication session associated with the subscription request in dependence on the instruction not to record the route; and
wherein the filter criteria comprises a subscriber specific filter criteria, and in response to the subscriber specific filter criteria matching a system specific filter criteria, apply a combination of both the system specific filter criteria and the subscriber specific filter criteria.

15. An apparatus according to claim 14, wherein said filter criteria is comprises a the system filter criteria.

16. An apparatus according to claim 15, wherein the system filter criteria is received from one of a network entity or a database.

17. An apparatus according to claim 15, wherein the system filter criteria is configured in the apparatus.

18. An apparatus according to claim 15, wherein said system filter criteria is applied to all subscriber messages.

19. An apparatus according to claim 14, wherein said processor is further configured to receive a subscriber filter criteria.

20. An apparatus according to claim 14, wherein the system specific filter criteria is configured to override the subscriber specific filter criteria.

21. An apparatus according to claim 14, wherein the subscriber specific filter criteria is configured to override the system specific filter criteria.

22. An apparatus according to claim 14, wherein the processor is further configured to receive the instruction to record the route from a home subscriber server.

23. An apparatus, comprising:
determining means for determining that a network entity is required to record or not to record a route of a communication session associated with a subscription request for a server providing a subscribed service; and
processing means for sending to a network entity, in response to said determination, a filter criteria comprising an instruction to record or not to record the route of the route of the communication session, the instruction to record or not to record the route indicating whether the network entity is to record or is not to record the route, wherein the filter criteria comprises a subscriber specific filter criteria and a system specific filter criteria, the filter criteria indicating the network entity, in response to the subscriber specific filter criteria matching the system specific filter criteria, is to apply a combination of both the system specific filter criteria and the subscriber specific filter criteria.

24. An apparatus, comprising:
a serving call state or session control function associated with a server providing a subscribed service;
receiving means a receiver for receiving a subscription request for subscription services from the server and for further receiving an instruction to record or not to record a route of a communication session associated with the subscription request, the instruction being part of a filter criteria;
wherein the serving call state or session control function selectively records a route of the communication session associated with the subscription request in dependence on the instruction to record the route, and wherein the serving call state or session control function further does not record the route of the communication session associated with the subscription request in dependence on the instruction not to record the route, and wherein the filter criteria comprises a subscriber specific filter criteria, and the serving call state or session control function, in response to the subscriber specific filter criteria matching a system specific filter criteria, applying a combination of both the system specific filter criteria and the subscriber specific filter criteria.

25. A method according to claim 13, wherein said filter criteria is a comprises the system filter criteria.

26. A method according to claim 25, wherein the system filter criteria is received from one of a network entity or a database.

27. An apparatus comprising:
a processor configured to
determine that a network entity is required to record or not to record a route of a communication session associated with a subscription request for a server providing a subscribed service; and
send to a network entity, in response to said determination, a filter criteria comprising an instruction to record or not to record the route of the communication session, the instruction to record or not to record the route indicating whether the network entity is to record or is not to record the route, wherein the filter criteria comprises a subscriber specific filter criteria and a system specific filter criteria, the filter criteria indicating the network entity, in response to the subscriber specific filter criteria matching the system specific filter criteria, is to apply a combination of both the system specific filter criteria and the subscriber specific filter criteria.

28. An apparatus according to claim 27, wherein the system filter criteria is received from one of a network entity or a database.

* * * * *